United States Patent
Snyder et al.

(10) Patent No.: US 8,719,082 B1
(45) Date of Patent: May 6, 2014

(54) AUTOMATIC BID ADJUSTMENTS FOR ELECTRONIC ADVERTISING

(75) Inventors: Luke A. Snyder, Seattle, WA (US); David Richard Brandt, Issaquah, WA (US); Eric Alfred Herrmann, Snohomish, WA (US)

(73) Assignee: Amazon Technologies, Inc., Reno, NV (US)

( * ) Notice: Subject to any disclaimer, the term of this patent is extended or adjusted under 35 U.S.C. 154(b) by 1075 days.

(21) Appl. No.: 12/267,870

(22) Filed: Nov. 10, 2008

(51) Int. Cl.
*G06Q 30/00* (2012.01)
*G06Q 90/00* (2006.01)

(52) U.S. Cl.
CPC .................................... *G06Q 90/00* (2013.01)
USPC ........................................................ 705/14.1

(58) Field of Classification Search
CPC ................................................................ G06Q 90/00
USPC ....................................................... 705/14.1
See application file for complete search history.

(56) References Cited

U.S. PATENT DOCUMENTS

2008/0255921 A1* 10/2008 Flake et al. .................... 705/10

OTHER PUBLICATIONS

U.S. Appl. No. 12/204,636, filed Sep. 4, 2008, for Luke A. Snyder et al.
U.S. Appl. No. 12/204,650, filed Sep. 4, 2008; for Luke A. Snyder et al.
U.S. Appl. No. 12/204,663, filed Sep. 4, 2008, for Lucas P. Hansen et al.

* cited by examiner

*Primary Examiner* — Daniel Lastra
(74) *Attorney, Agent, or Firm* — Novak Druce Connolly Bove + Quigg LLP

(57) ABSTRACT

The accuracy of bid amounts for electronic advertising is improved by accounting for factors such as the cost-per-click (CPC) ratio for each ad. When a provider such as a search engine selects advertisements using automated auctions, it can be desirable for an advertiser to avoid underbidding for ads when the ads generate a significant amount of revenue or profit, or are otherwise performing well. Various algorithms can be used to generate a bid adjustment factor that allows bid values to be increased (or decreased) as appropriate, based on information such as CPC information. By calculating a separate adjustment factor, the amount of adjustment can be monitored and/or capped to avoid overspending. The algorithms also can utilize information at various levels of categorization, and at different time intervals, depending on the amount and type of information available, in order to provide an accurate and significant result.

25 Claims, 5 Drawing Sheets

AUTOMATIC BID ADJUSTMENTS FOR ELECTRONIC ADVERTISING

BACKGROUND

As the number of users viewing information and purchasing items electronically increases, there is a corresponding increase in the amount of advertising revenue spent in electronic environments. In some cases, advertisements are specifically selected for certain pages or other interfaces displayed to a user. In other cases, these advertisements are selected based on content that can be displayed in any of a number of different pages. For example, a user might search for information about a keyword through a search engine. When a results page is returned to the user that includes search results relating to that keyword, at least one advertisement can be included with the results page that relates to the keyword and/or search results. Often, the advertisement includes a hypertext link or other user-selectable element that enables the user to navigate to another page or display relating to the advertisement.

In many cases, there can be multiple advertisements or offers displayed that are related to content of a given page displayed to a user. For example, a user viewing a search results page might see advertisements for items that are related to at least one keyword that was used for the search query. In another example, a user viewing a display page for an item in an electronic marketplace might see one or more offers or advertisements for items that are related to some aspect of the featured item on that display page. In order to determine which advertisements are to be displayed in each case, as well as the order in which those advertisements appear, a provider of a site or other such electronic content can utilize a "bidding" process wherein potential advertisers or sponsors submit bids indicating how much an advertiser is willing to spend for a sponsored ad to be displayed on the page. Winning bids then can be ranked to not only determine which ads to display, but the bids can be ranked from highest to lowest in order to determine the order in which the ads are displayed.

Due to the large number of combinations of items, keywords, advertisements, and other such aspects, many advertisers and providers rely on automated advertising systems to generate, accept, rank, and otherwise process such bids. It thus can be important to an advertiser that such a system generate reasonable bids, and that the generated bids meet business targets for that advertiser. For example, an advertiser might utilize an efficiency target, where efficiency is determined as the amount of money spent for an advertisement, or the "spend" for that ad, compared to the corresponding amount of revenue generated as a result of the advertising. An advertiser then might adjust all advertising bids by a certain percent in order to improve the advertising efficiency. In some cases, an advertiser might also manually adjust a bid price for a certain item or category of items in order to improve the efficiency in those areas.

As search engines continue to advance, however, the determination of which advertisements to feature becomes more complex. For example, a search engine might utilize a "quality score" for an advertiser in conjunction with the bid prices from the advertiser. In this case, an advertiser might not be featured in the top spot even if that advertiser has the highest bid for an item when the advertiser has a relatively low quality score. Another advancement is that search engines can use broad matching algorithms, where search engines may decide to enter keywords, specified by an advertiser, into broader and broader auctions in order to increase potential revenue from the single keyword as the bid prices increase. Further, many systems utilize various rollup levels such that the efficiency for a given keyword can be forecast using data for other keywords that should perform similarly. Using such a bidding approach, however, can be a "pessimistic" approach as the approach does not consider the actual cost of the rollup keywords, which could result in a bid that is potentially too low and that could prevent this new keyword from ever showing and gathering data necessary to make an accurate bid determination.

BRIEF DESCRIPTION OF THE DRAWINGS

Various embodiments in accordance with the present disclosure will be described with reference to the drawings, in which.

DETAILED DESCRIPTION

Figure 1:
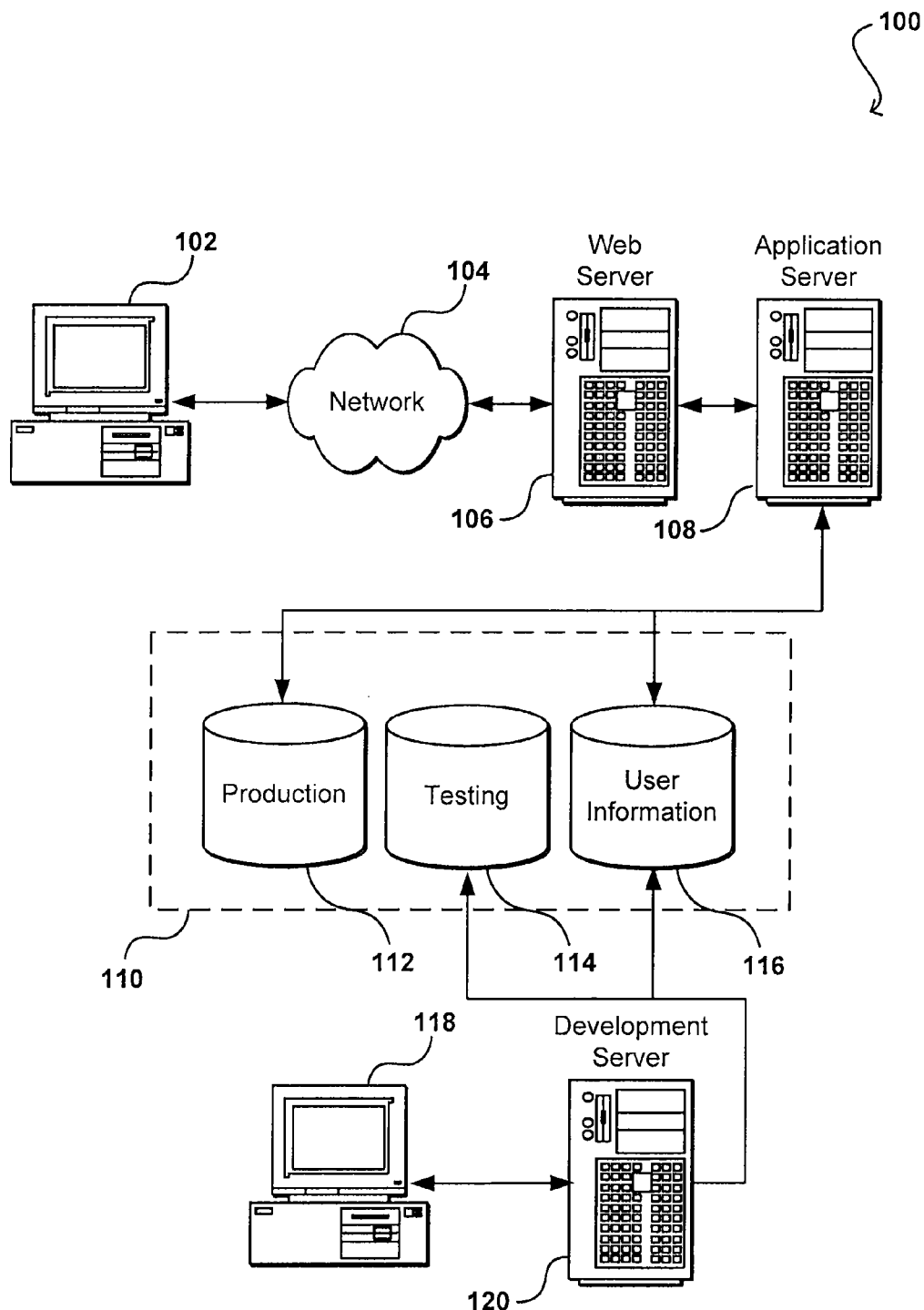
FIG. 1 illustrates an environment in which various embodiments can be implemented.

Systems and methods in accordance with various embodiments of the present disclosure may overcome one or more the aforementioned and other deficiencies experienced in conventional approaches to determining appropriate bid prices for elements such as advertisements, sponsored ads, and/or sponsored links in an electronic environment. As known in the art, "sponsored links" or "sponsored ads" are typically used with electronic interfaces such as Web sites, search engines, applications, etc., wherein an advertiser provides a navigational element such as a hypertext link and associated text and/or graphics to be displayed in the electronic interface, that enable a user to select or otherwise access the navigational element to be directed to a page or other location provided by the advertiser. The advertiser typically will pay a provider of the electronic interface based upon an aspect of each sponsored ad, such as the number of times users select the navigational element included therein.

Systems and methods in accordance with various embodiments provide an automated solution to the issue of determining bid prices for advertisements in an electronic environment. In one embodiment, a model for determining bid prices for various items takes into account a factor such as the "cost per click" information reported by a search engine or other such provider for a given keyword, advertisement, etc. As referred to in the art, the cost per click (CPC) generally refers to the amount of money that an advertiser pays to a provider displaying the advertisement when a user clicks on the ad, or otherwise selects a navigational element of the ad, which directs the user to a Web site or other electronic content publication of the advertiser. In some instances, the advertiser typically is charged by the provider only when a user clicks on or otherwise selects the advertisement. In these cases, it can be in the best interest of the provider not to base the selection, position, or prominence of the advertisement on only the highest bids for advertisements to feature, but also to consider other factors, such as a likelihood that a user will actually click on an ad if displayed (and thus the likelihood that the provider will be paid for displaying the ad). A common example is keyword-based cost-per-click, where advertisers bid on search terms such as keywords or keyword combinations. When a user performs a search using a particular keyword, the displayed page of search results can also include a list of sponsored advertisements. The ordering of the advertisements can be based at least in part on the amount the advertiser has bid for the given keyword for each advertisement. In many cases, an advertiser will submit a bid price for an ad, such as $0.30, but the winning bid will be less than the submitted amount. For example, if the next highest bid was $0.20, then the winning bid might be $0.25, or some other amount between the bid price submitted by the advertiser and the next highest bid price submitted by another advertiser. As discussed elsewhere herein, other factors can be taken into account as well, such as an advertiser rating, etc. Further, the advertiser might get a discount with a provider to whom the bid is submitted, such that the winning bid of $0.25 might actually end up as an actual "cost" of $0.21 cents to the advertiser (per click) after the discount is applied. Thus, it can be desirable to not only account for the CPC value, or the actual cost per click, but also to track a CPC ratio, or a value representing the amount the advertiser was willing to pay for an ad versus the amount that the advertiser actually paid. Various other factors also can affect the CPC ratio as discussed elsewhere herein.

Taking into account not only the actual cost per click values for an advertisement, but also the CPC ratio and/or other such factors tracking what the advertiser was willing to pay, allows bids to be determined that are adjusted for any discounts or other such information, thereby allowing the spend to be more accurately allocated across various advertisements. In one embodiment, a base bid price is determined for an advertisement. The base bid price can be determined using any appropriate algorithm or approach, such as by determining a target efficiency and an anticipated revenue, then determining the appropriate maximum bid price that will stay within that target efficiency. A determination can be made as to the number of data points (i.e., clicks) needed for the results based on those data points to be significant. A bidding chain can be determined that considers various levels of information, such as levels of related keywords, levels of landing pages, levels of matches, etc. The bidding chain can be used to determine a bid multiplier that can be applied to the base bid. Bidding decay values also can be analyzed for the bidding data to determine a normalized weighting and adjust the determined bid multiplier accordingly. The weighted bid multiplier then can be applied to the base bid for the advertisement in order to determine an adjusted bid price for the advertisement. In some embodiments, the same bid chain and decay information can also be used to generate the base bid.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/ or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
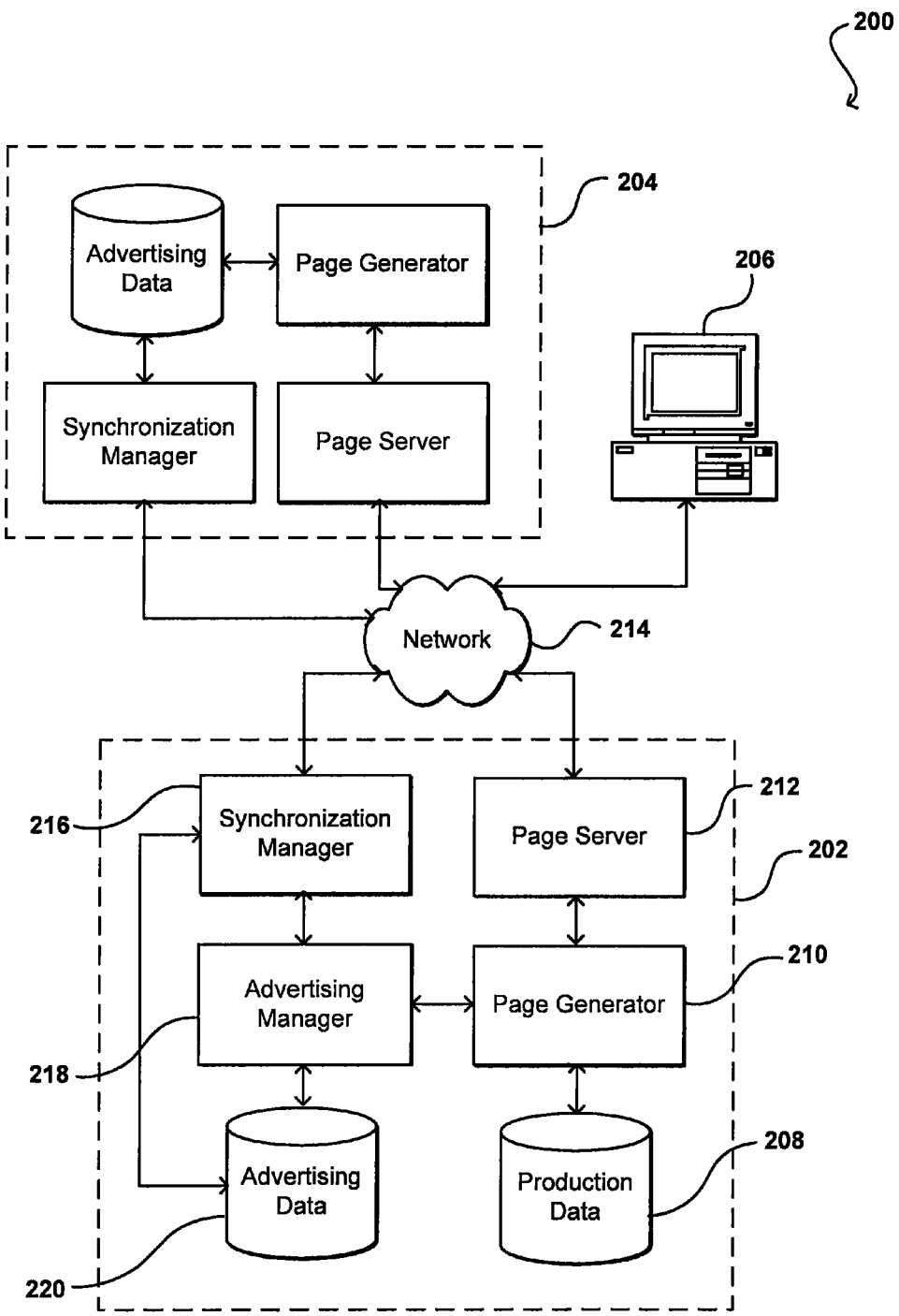
FIG. 2 illustrates components for determining aspects of advertisements to provide to a separate provider that can be used in accordance with one embodiment.

An environment such as that illustrated in FIG. 1 can be useful for a provider such as an electronic marketplace, wherein multiple associates or other content providers might wish to advertise on pages for the marketplace itself. Such an environment also can be useful for an advertiser, who wishes to generate advertisements to be displayed by a provider, such as a search engine, and determine an appropriate bid prices for each such ad. A provider such as an electronic marketplace might also wish to advertise on other sites or with other providers. The electronic environment in such cases might include additional components and/or other arrangements, such as those illustrated in the configuration 200 of FIG. 2. In this example, components for an advertising entity 202 can generate advertising associations such as keyword-landing page pairs, as well as related elements such as creative elements and bid prices, to be submitted to components for another provider 204. It should be understood that while keyword-landing page pairs and sponsored ads are used for purposes of explanation, any association of a navigational process with content in an electronic environment can be used with, and benefit from, selections and other processes described with respect to various embodiments.

In this example, the advertising entity generates and serves pages of content available to any appropriate end user 206, and thus can include components such as a production data store 208 that can be used by a page generator 210 to generate pages that can be served by a page server 212 (such as a Web server in a Web-based environment) over a network 214 to the end user 206. Similarly, any other appropriate provider 204 can include components such as page generator and page server components for generating and serving pages of content to a user. While many of the embodiments are described with respect to a Web-based environment, it should be understood that pages are not limited to Web pages, but can include any application page or other interface page that can be displayed or otherwise conveyed to a user.

If the advertising entity 202 wishes to advertise with the provider 204 using sponsored links or other advertisements that direct a user back to a page provided by the advertising entity, the advertising entity also can include components for determining the landing pages to be associated with the advertisements. While the advertising components in this example are shown to be part of the advertiser's system, it should be understood that these components can be part of a separate system or provided as a third party service, for example. In this example, the advertising entity system includes an advertising manager 218, which as discussed elsewhere herein can include any combination of devices and/or processes operable to encompass, monitor, and/or control a number of different algorithms and components for selecting and deciding upon landing pages, as well as to dynamically determine categories for each selected landing page, apply templates and/or creative elements for each category, and determine appropriate bid prices to use for each advertisement. When the advertising manager 218 decides on a landing page, category, and other such information to be associated with content on the provider pages, the advertising manager 218 can store the advertising data to an advertising data store 220, which in some embodiments can comprise separate tables in the production data store 208. The advertising data store can include any information related to advertising, such as ad performance data, bid histories, bid amounts, categorizations, creative elements, etc. Portions of this data alternatively can be stored and/or accessed from other appropriate storage devices of the system and/or across the network. The advertising entity's system also can include a synchronization manager 216 that can work with a synchronization component of the provider 204 to periodically synchronize the advertising data with the advertising data stored at the provider 204, such that the appropriate landing pages, creative content, and financial information can be designated and updated as desired. When a user 206 views a page of content served by the provider 204, the page can include an advertisement that will direct the user to a page of the advertising entity 202 upon selection by the user.

Figure 3:
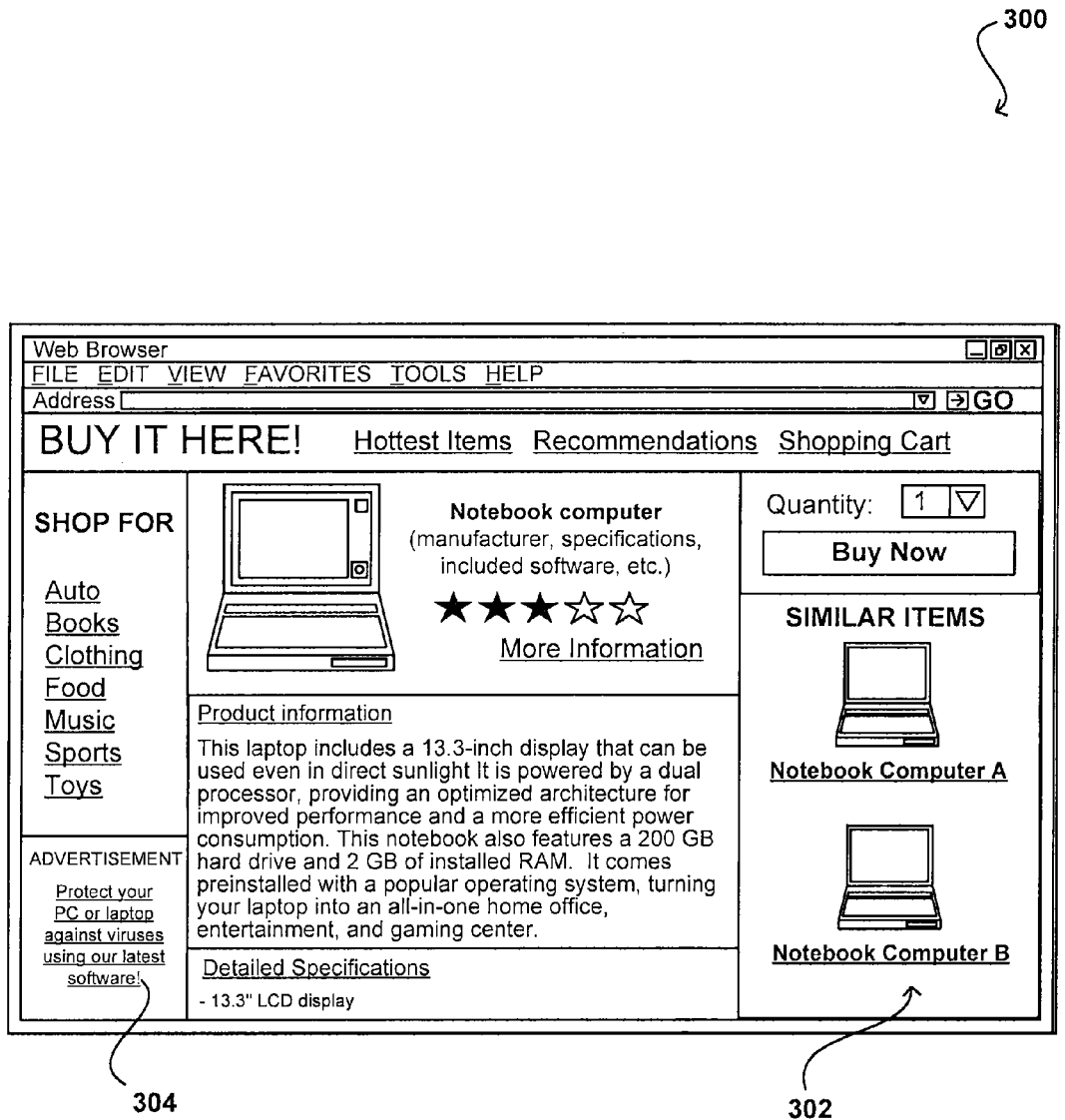
FIG. 3 illustrates an interface including ranked sponsored links that can be generated in accordance with one embodiment.

As discussed above, the advertisement can include at least one sponsored link, such as a hypertext link displayed on a Web page, for example. FIG. 3 illustrates an example of a Web page 300 displayed in a browser application, wherein the Web page includes two sponsored links 302 that each direct a user to another portion of the same site or a page on another site when selected. The selection of the sponsored links, as well as the placement or ordering of the links, can be determined based in part on bid price as discussed herein. Another sponsored ad 304 is shown that directs the user to a site of a third party advertiser, etc. This ad may not be part of a bidding process, or for this space only the winning ad might be displayed. Sponsored links to be associated with a page can be selected based on any appropriate factor, such as content of a page, a keyword used to navigate to that page, etc. Sponsored links also can be displayed on any other appropriate interface capable of following a link or similar navigational element to another source of information, and as such the term "link"

will be used for purposes of explanation but should not be interpreted as limiting the types of navigational elements that can be used with various embodiments.

As discussed, sponsored links in one example are displayed when a user searches for information in a search engine, and receives a list of search results (referred to herein as a "results page"). There are many aspects to deciding which sponsored links might be desirable to be displayed on such a results page. For example, advertisers may wish to display ads that are relevant to the content of the search results, which might be of interest to the user. For example, a user searching for information on automobiles can, on average, be more likely to purchase a book on automotive repair than a set of steak knives. Thus, the advertiser would prefer to spend the advertising money with respect to those keywords or categories which are "relevant" to the item (e.g., any product or service that can be consumed) being advertised. Further, a category can have many subcategories, and an advertiser might not decide that the advertiser wants to spend money to advertise for an "automotive" category, but would rather advertise for an "automotive books" sub-category.

Various aspects of an advertisement can be taken into consideration by a potential advertiser. For example, if an advertiser spends a significant amount of money for an ad to be featured with a keyword or category, the advertiser would like to display information in addition to the sponsored link that is successful in getting users to want to follow the link. For example, an advertiser could display a generic message with each advertisement, such as the name and slogan of the advertiser, but that message might in general be less effective than a message tailored to the content or keyword. In the example where the user is searching for information about automobiles, a message such as "Buy the latest parts for your automobile at discount prices" might be substantially more effective than a generic message "Big Box Store—we offer everything under the sun". An advertiser might also want to tailor the message even further, based on the category or keyword. For example, a user searching for information about an automobile that has not yet been placed into the market, such as next year's new hybrid vehicle, might not be interested in seeing a message about buying parts since the car is not yet available. It might be beneficial to instead display a message such as "Get the latest books and magazines about the next generation hybrids". While more narrowly tailored ads can be significantly more successful, however, the number of possible keywords, categories, and sub-categories is extremely large and there must be some decisions made as to which categories and keywords make financial sense to provide with tailored advertisements, and at what level in the subcategories does the advantage of a further tailored message no longer make sense.

Once an advertisement has been placed and a user actually clicks on or otherwise selects a sponsored link, the user is directed to a landing page such as may be specified by the advertiser through the advertising manager. Considering an example of an online marketplace that offers items in several different categories, a basic approach would simply direct the user to the home page, welcome page, or other such introductory display for the marketplace. It can be more effective, however, to direct the user to a page (herein referred to as a "landing page") offering items or displaying information related to the keyword or category for which the advertiser decided to advertise and the user was searching for information. In the example where a user was searching for information about hybrid automobiles, an address for a landing page could be selected based on the landing page displaying information about automobiles, or more advantageously hybrid automobiles. Again, however, a decision can be made about the level that makes sense for each keyword or category. Given a marketplace with thousands or even millions of items, and the fact that there can be millions of possible categories and keywords, it can be desirable to have a system that automatically and accurately selects landing pages and other options for those choices that make financial sense for an advertiser. Conventional approaches would simply use a search index if the landing page is a search page or an item grouping if the landing page is a detail page for an item. These approaches typically do not get any more specific, and as such are of limited use or accuracy.

For each ad, an advertiser thus can desire to select an optimal landing page for each advertisement that will help to cause users to view and/or select the advertisement, and thus drive users to a landing page of the advertiser. There are many different approaches that can be used to select an appropriate landing page to associate with a keyword, such as are described in co-pending U.S. patent application Ser. No. 12/204,650, filed Sep. 4, 2008, entitled "Landing Page Selection for Linked Advertising".

It is typically not enough, however, to decide to advertise for a given keyword and determine an appropriate landing page to associate with that keyword. An advertiser typically must also consider other related aspects, such as the type of creative elements to include in the advertisement. Approaches for determining such elements are described, for example, in co-pending U.S. patent application Ser. No. 12/204,663, filed Sep. 4, 2008, entitled "Dynamic Categorizations for Electronic Advertising".

As discussed above, an advertiser in many cases must determine how much to spend for each instance of the advertisement. This can include determining a maximum bid price to submit to an outside vendor or provider in order to attempt to "win" a position for the advertisement on the desired page, interface, etc. Approaches for determining such bid prices are described, for example, in co-pending U.S. patent application Ser. No. 12/204,636, filed Sep. 4, 2008, entitled "Dynamic Bid Price Determination for Electronic Advertisements". Each of these co-pending applications is hereby incorporated herein by reference.

In many search engines, for example, there can be several advertisers wishing to advertise for a given search keyword or category, and at least some of those advertisers are willing to pay a premium for having the most prominently featured advertisement displayed for a given keyword. In some cases only one advertisement with a link will be displayed, while in other cases there can be a list or set of ads displayed, and an advertiser might pay extra to be displayed in a more prominent position (e.g., closer to the top of a results page, above the fold, between search results, etc.). Many search engine and other such providers allow these advertisers to bid for ad space, with the winning bid being displayed most prominently, and lower bids being displayed less prominently, if at all. An advertiser then not only decides how much to bid for an advertisement based on projected conversions or revenue for each advertisement, but generally also considers the placement of the advertisement on the result page and how much extra the advertiser is willing to pay to be featured more prominently. For example, an advertiser bidding $0.03 per advertisement (e.g., based on number of displayed links or number of followed links, for example) that is being featured third in a list of advertisers might be willing to adjust the bid price to $0.10 per advertisement to instead be featured at the top of the list. While this can increase the cost or "spend" for the ad, the number of extra users following the top link (as opposed to a lower link) might more than make up for the additional cost. Further, an advertiser might make significantly more money from an advertisement at certain times of the day, week, year, etc., and thus might be willing to spend differently at different times. An advertising manager thus may also be configured to analyze revenue, conversion rates, historical data, and other information that can be stored with the advertising data in order to determine an appropriate price to bid for each ad.

As discussed above, it can be desirable to improve the maximum bid price determined and submitted to various providers. Conventional approaches utilize efficiency in determining a maximum bid price, where efficiency is determined, for example, by comparing the spend with the revenue for a given ad. Using the knowledge that search engines and other providers typically display keywords in a second- or victory-price auction manner, the bid per keyword in such an example can be defined generally as "revenue per clicks," where "revenue" is defined as the downstream revenue from the ad and "clicks" is the total number of times a click has been registered for the ad. Such an approach is useful if one concern is not exceeding a business target, such as a desired efficiency goal or an overall spend amount for a given category or advertisement, for example. In order to improve revenue, however, it can be desirable to ensure that the system is also not underbidding the business target. In certain situations, it can be desirable and/or beneficial to raise the determined maximum bid for an advertisement after examining factors such as the cost per click, which can lead to improved financial performance in terms of revenue, while still maintaining the same efficiency goals.

For many advertisements, however, there may not be enough specific data available to make an accurate decision. In some systems the advertising data is stored in a hierarchical fashion, such as is illustrated in the example categorization tree 400 of FIG. 4. For any given ad, there can be multiple levels of information maintained that can be used to aggregate enough data to make an accurate bidding decision. For example, using the example tree in FIG. 4, specific data for an advertisement can be analyzed, such as performance data for a specific match type 402, landing page 404, keyword 406, category 408, suggestor 410, provider 412, or Website 414. As should be apparent, a variety of other levels, arrangements, types of data, etc., can be used in various other embodiments. As used herein, "match type" refers generally to the way in which a provider is allowed to "match" terms when selecting ads to include in an auction for an entered search query. In one embodiment a user is able to select an "exact" match type, a "phrase" match type, and a "broad" match type, although various other possibilities and combinations are possible as should be apparent. For example, if the keyword corresponding to the ad is "book", then an "exact" match selection would only bid for the keyword "book", where a "phrase" match selection would allow the ad to be considered if a user enters a term such as "text book", while a "broad" match selection would allow a provider to include the ad for auction for any query determined to be sufficiently related to the keyword "book", such as "reading" or "encyclopedia". The landing page 404 refers, as discussed above, to a page to which a user is directed when selecting a navigational element of the ad. An advertiser might place an ad for the keyword "book" that over time directs a user to various pages, such as pages for different books that are being featured, different book listing pages, etc.

Various other levels of the hierarchy allow other aspects to similarly be determined and tracked over time. For example, bid data can be analyzed for multiple keywords 406 within a given category 408, as well as multiple categories for a given suggestor 410. A suggestor in one embodiment is a module or process for utilizing an algorithm to "suggest" keywords for which to place advertisements, categories for those keywords, etc. Examples of suggestors can be found, for example, in the applications incorporated by reference above. An advertiser also might want to look at data for different providers 412, as an advertiser might bid and/or pay different amounts for advertisements placed with different providers, who will ultimately display the ads in different locations, under different circumstances, etc. All this data also might be accumulated for one or more Web sites 414, which can include the landing pages 404 and other aspects relating to the advertisements.

An advantage to such a hierarchy is that many systems track advertising information such as spend, revenue, and bid data for each advertisement. Many systems also track data for each instance of an advertisement, such as when a user views or selects the ad and whether the user purchases an item as a result of the ad. For any given click, the system can also store information such as which provider displayed the ad, what the bid price was, what ranking the ad had, etc. For any set of clicks or other data points there can be performance data determined that includes a number of different dimensions, such as total number of impressions, resulting revenue, number of conversions, etc. Organizing these dimensions hierarchically allows the dimensions to be rolled up as necessary to gather information at a higher level. So, for example, if it is desired to determine performance information for a particular keyword with respect to a particular category for a particular provider, performance data can be obtained for a number of different dimensions at different levels in the hierarchy that relate to those criteria. Such aggregation of data into higher levels can provide enough data that estimates can be made for accurate bid prices, bid adjustments, and other such data, when there is not otherwise enough recent data available at a given level to otherwise make an appropriate determination. The categories also need not be item categories, such as electronics, but can be mapped to any appropriate categorization, such as a hierarchical keyword categorization or bidding categorization.

Certain embodiments collect information across various vendors or providers. If an advertiser wants to place a bid for an advertisement with a first provider, but does not have enough data for that provider to make an accurate bid adjustment, then the advertiser can look at data for similar ads with other providers, and use those data points to make a determination. The data points for the first provider can be weighted more heavily than for other providers when determining a bid price for the first provider, as discussed elsewhere herein.

While it would in many instances be desirable to generate a bid using data for an exact keyword-landing page pair in a certain category for a certain vendor or provider, etc., there many times will not be enough data, or at least enough recent data, to make an appropriate determination. It thus can be advantageous to take advantage of related information in the hierarchy to make improved bidding decisions based on a larger data set.

Figure 4:
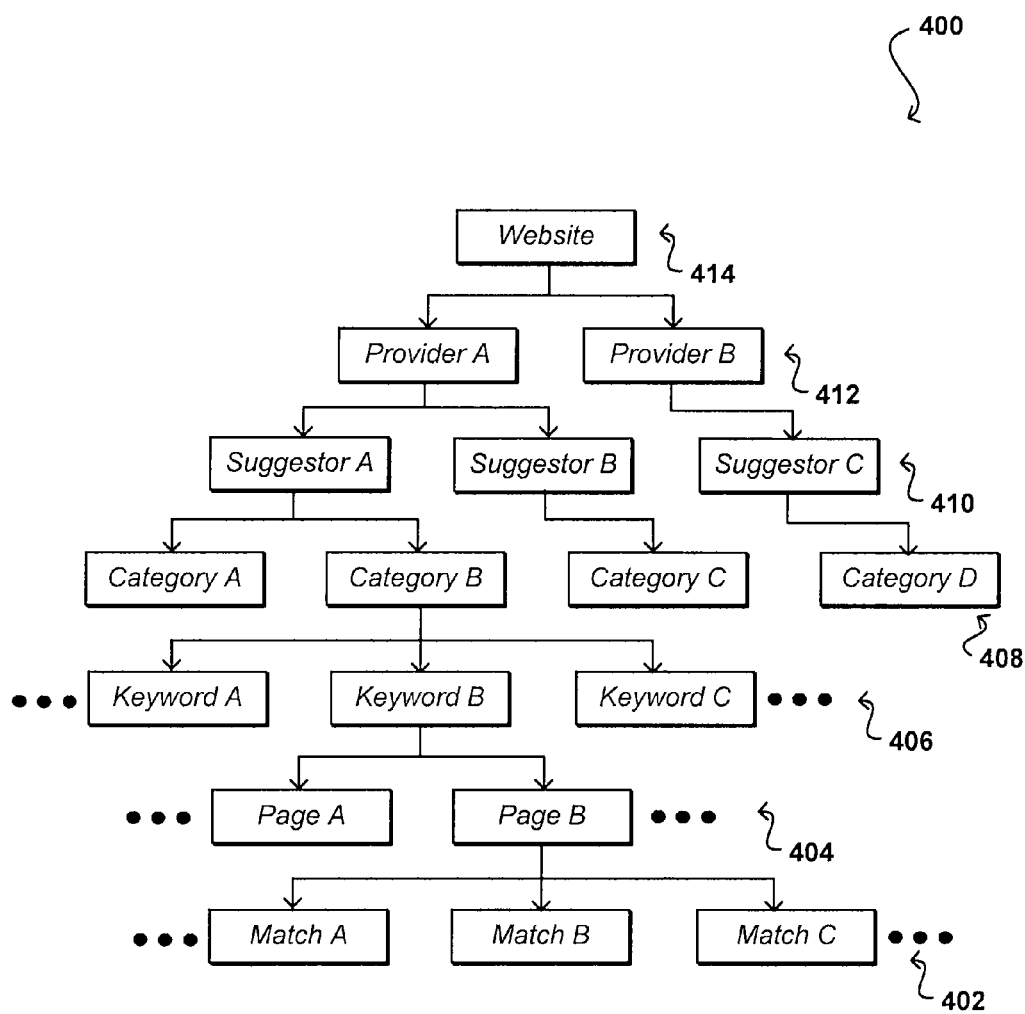
FIG. 4 illustrates a data hierarchy that can be used in accordance with one embodiment.
Figure 5:
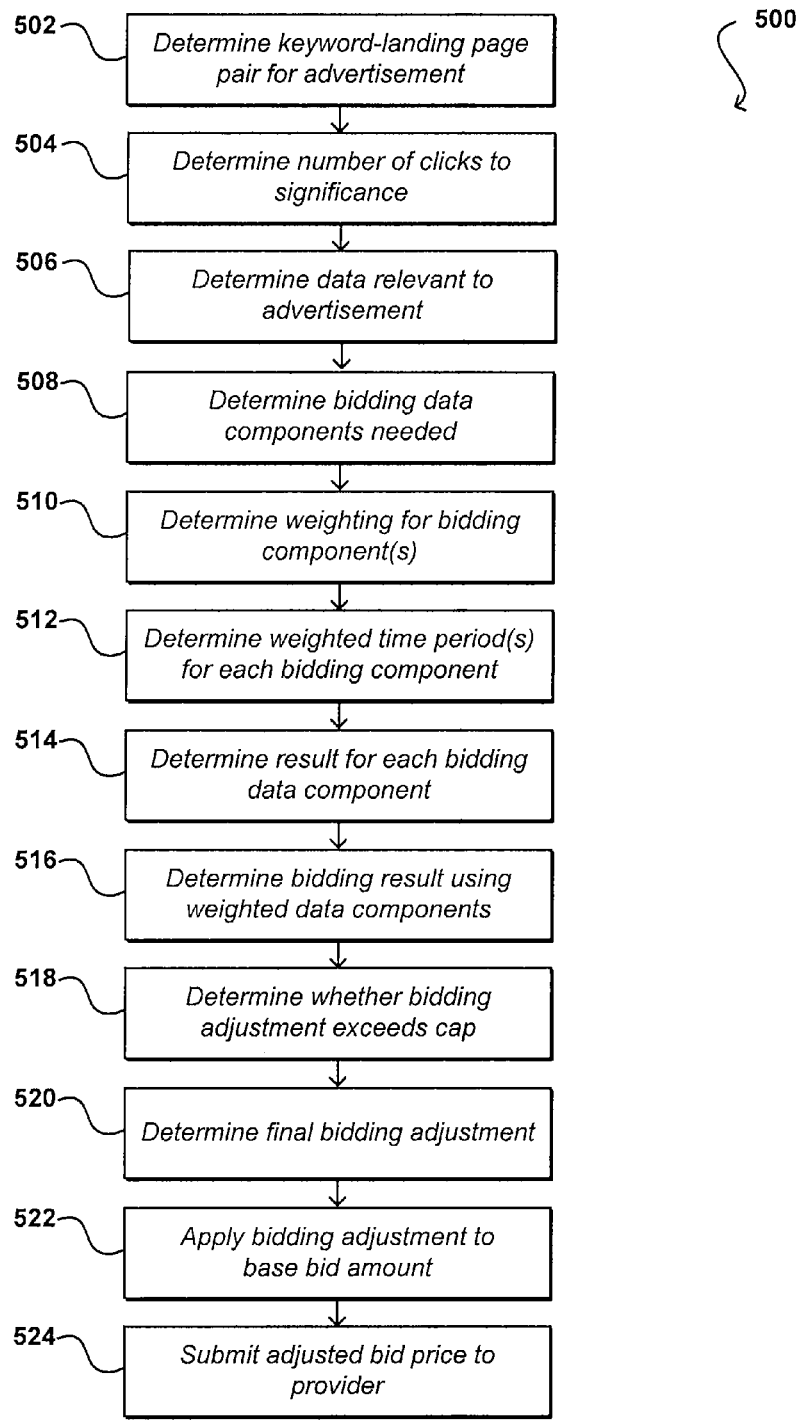
FIG. 5 illustrates steps of a process for determining a bid price that can be used in accordance with one embodiment.

FIG. 5 illustrates an example process 500 for determining an adjusted bid price that can be used in accordance with one embodiment, and can take advantage of a data hierarchy such as is discussed with respect to FIG. 4. This example process calculates both a bid price and an adjustment factor, although other processes can simply determine an adjustment factor to be applied to a base bid determined by another process, such as discussed elsewhere herein. In this process a keyword-landing page pair is determined for which the advertiser wishes to submit a bid to a provider 502. Processes for selecting keyword-landing page pairs are known in the art, and examples also are described in the references discussed above that are incorporated by reference. As such, these processes will not be discussed herein in detail.

For the selected keyword-landing page pair, a determination is made as to the number of clicks necessary to consider the data resulting from the clicks to be significant 504. Any appropriate algorithm can be used to determine the number of data points necessary for the results to be significant. In some cases, the appropriate number of clicks can be set manually or fixed to a specific value. In other cases, a system can determine and/or adjust the number of clicks programmatically, based information such as a categorization of a keyword. For example, an advertiser selling a wide variety of items might require a larger number of clicks for high-volume categories, such as books, than for relatively low-volume categories, such as televisions. For a category that performs relatively well, for example, an advertiser might set a value such as five-hundred or one-thousand data points as a point of significance.

Relevant data for the keyword-landing page then can be determined 506. In one embodiment, this includes an ordered set, prioritized grouping, or "chain" of bidding data using data at various levels in the hierarchy relating to the current keyword-landing page pair. For example, a chain can be formed comprising a series of bidding data components (e.g., B1, B2, B3, B4, B5, B6, and B7) each having a different level or type of information for at least one data parameter. These bidding components can correspond to levels of the data hierarchy, such as that shown in FIG. 4, where the first bidding data component in the chain corresponds to a lowest level in the hierarchy (at least a lowest level used for the chain), and each subsequent bidding data component corresponds to a progressively higher level in the hierarchy. As an example, the chain can include components such as:

B1=bidding data for Website A, Provider A, Suggestor A, Categorization B, Keyword B, LandingPage B, MatchType A B2=bidding data for Website A, Provider A, Suggestor A, Categorization B, Keyword B, LandingPage B, all match types B3=bidding data for Website A, Provider A, Suggestor A, Categorization B, Keyword B, all landing pages, all match types B4=bidding data for Website A, Provider A, Suggestor A, Categorization B, all keywords, all landing pages, all match types As can be seen, each bidding data component includes data at a progressively higher level of the data hierarchy in FIG. 4. Component B1 is the most specific data component, as B1 relates to a specific categorization, keyword, landing page, and match type. Set B2 is less specific to the particular ad for the keyword-landing page pair, as B2 includes data for all match types corresponding to that keyword-landing page pair. B3 also includes data for all landing pages for that keyword, and B4 includes data for all keywords in a certain category of keywords. Additional components can be used that would be less specific as should be apparent. There also can be additional or other levels to the hierarchy, such as various sub-categories, etc.

In such a chain, it can be desirable to use just the first bidding data component (B1) to estimate or adjust a bid price, as that bidding data component is most directly related to the specific keyword-landing page pair and match type. As discussed, however, there may not be enough data points in that set to determine a significant result, such that results from the next bidding data component in the chain also can be considered. For example, if it is determined that there needs to be at least four-hundred data points to make a significant determination, and the first bidding data component only contains two-hundred and fifty data points, then data from the second bidding data component in the chain also can be considered. If the total number of data points in the first and second bidding data components meets or exceeds four hundred, then that may be a sufficient depth to analyze in the chain. Since the data from the first bidding data component is more relevant to this particular sponsored ad, however, the data points from the first bidding data component can be weighted more than data from the second bidding data component, and so on.

The bidding data components are thus analyzed, starting at the first component, to determine how many components are necessary to at least meet the number of data points for significance 508. Once the number of necessary data points is met, no further analysis of the chain is needed (although other embodiments can include at least some weighting of data from additional levels in order to further minimize spikes or undesired fluctuation in the bid price as discussed elsewhere herein).

Once the number of bidding data components is determined, a contribution weighting can be determined for each bidding data component 510. In the example above, if the first bidding data component contains two-hundred and fifty of a necessary four hundred data points, then the result generated from that component can be weighted to 250/400 or 62.5% of the final result. If the second bidding data component contains more than one-hundred and fifty data points, then that bidding component can still account for a weighting of only 150/400 or 37.5% of the final result. Even though the second bidding set may contain more data than the first set, since there is a preference in this example to favor more relevant data, then the first component can account for the full percentage of data points in the component relative to the number of points for significance, while any subsequent component can account only for the portion necessary to obtain the number needed for significance. If the first three components in the chain have two-hundred, one-hundred, and eight-hundred data points, respectively, and the minimum is four-hundred data points, then the first component in this example would be weighted for 50% of the final result, the second component would be weighted for 25%, and the final component would only be weighted 25% as that is the amount remaining to reach the level of significance. It should be understood, however, that other approaches to weighting can be used that favor other time periods or approaches, etc.

In addition to favoring the most relevant data, it also can be desirable to favor more recently obtained data. For example, a book will tend to sell the most copies the first week of its release, in general, and then will sell fewer copies in subsequent weeks until the book reaches a sales level that does not vary significantly week to week. In such a case, it would be undesirable to look at all the data over time equally, as ads for the book around the time of release will likely convert much differently than ads for the book a year after the initial release. Weighting all these data points equally can result in overbidding for an ad for that book. Further, there might have been an occurrence that caused a recent increase in the conversion data, such as the book being made into a movie that is now in theaters or the book being featured on a popular television show. In such a case, relying on data for all times equally could result in underbidding for the ad. Problems exist in relying too heavily on recent data, however, as there also can be an event, sale, or other such temporary occurrence that can cause a spike or anomaly in the recent data. For example, if an artist was in the news the previous week, then more sales of the artist's work likely would have been recorded than for other weeks. If the prices are adjusted based mostly on the recent data, then the generated bid might be too high as the conversions this week likely will be less than last week. Further, there may not be enough recent data points to rely heavily upon the recent data. A certain number of data points are needed for any trends or changes to be determined to be significant.

Accordingly, systems and methods in accordance with various embodiments can take advantage of what are referred to herein as "decays", or different periods of time over which the data can be treated differently. For example, each bidding data component can have a set of decays associated therewith. In other embodiments, decays can be configurable and can be applied to all the components equally at the time of bid determination, etc. A bidding component in one system includes a set of decays for each parameter contained therein. The decays in one example are half lives with periods such as one week, two weeks, one month, three months, etc. Any other appropriate periods can be used as well, as may be relevant for the particular application. Advertisers with a substantial number of ads or amount of data can tend toward shorter decay periods, while advertisers with less data can tend toward longer periods.

The weighting over the decays in one embodiment is determined by the number of data points (e.g., clicks) from a recent period, in relation to the half life periods. It can be important to choose a proper weighting in order to minimize potential risk, and not favor any period too heavily, but as the number of data points increases it can be desirable to use faster decays as the most recent data will be more important and/or relevant in determining an accurate bid price. When there are fewer clicks or data points available, it can be desirable to be more cautious and use a mixture including a higher proportion of older decays.

A normalized weighting thus can be determined for each decay for a bidding component 512. For each decay, a dimension will report only values that are at most as old as the selected decay. Each decay then will have a specific number of data points available. If there are five-thousand data points for a given dimension then it might be adequate to trust the most recent decay. If there are only two clicks for a dimension in the most recent decay, then it may be desirable to use one of more of the longer decays to improve accuracy.

In between these extremes, however, there is some uncertainty as to which decay will give the most accurate results. For example, if there are only one-thousand total data points and only fifty of them are in the most recent decay, the algorithm might decide to weight 40% based on the most recent data, and 20% of each of the next three decays. In this way, the more recent data is weighted more heavily, but the overall result is tempered more heavily by the older data (although less with each decay as the number of data points for each subsequent decay likely will increase due to the increase in period of time). Another algorithm might always use decreasing percentages (or weights) of each decay (such as obtaining 40% of the significant data from the most recent decay, then 30%, from the next recent, 20% from the next recent, and 10% from the least recent decay). There can be thresholds specified wherein if a recent decay period has a first number of data points then that decay period will be weighted by a first amount, and if the recent decay period has a second number of data points then the decay will be weighted by a second amount. The weightings can be normalized so that the weightings total 100%, or 1.0, depending on the normalization approach.

Thus, if an ad has been converting recently, or if there are a lot of data points for an ad, a decision can be made to be more aggressive and weight toward the faster or more recent data or decay(s). Appropriate ratios and/or mixing of decay data can be determined accordingly. A system in accordance with one embodiment might set a cap on the fastest decay, such as a cap of a 60% weighting, such that older decay data is always included to some extent as determined by the amount of data.

Once the decays for each parameter and component are determined, a result is generated for each level or bidding data component 514 by analyzing the data for each selected decay and combining the decay data according to the relevant weightings. When generating a bid adjustment factor using such a process, for example, the bid data analyzed can include information relating to previously submitted bid prices as well as the actual costs corresponding to each of the submitted bid prices, or the "winning" bid amount that resulted in the ad being displayed by a provider, etc. This can include, for example, a CPC ratio for previous advertisements. The results from the selected bidding data components then also are combined using the determined weightings 516 to determine an appropriate result.

This process thus far can be used to aggregate and weight appropriate data for an advertisement, such as may be used to generate an appropriate base bid and/or an adjustment factor. For example, the data at each level can include bid price data, conversion data, ranking data, and any other appropriate information that can be used to determine a bid price. The data can be aggregated and weighted as described above, then processed using an appropriate bid price generation algorithm.

The data at each level also can include discount and related data, such as the discount received from each provider for a given category, keyword, etc. The discount and related values can be aggregated and weighted using the same (or a similar) procedure as discussed above, then processed by an algorithm to determine the appropriate adjustment factor to be applied to the base bid price. While the discount and bid price can be accounted for using a single algorithm, it can be desirable to produce separate results in order to more easily monitor the amount of adjustment being made by the algorithm(s).

Once a bid adjustment factor has been determined, the bid adjustment factor can be analyzed to determine whether the factor is acceptable for various business goals or other such criteria 518. For example, an algorithm can cap an adjustment at a particular percentage of profit for an item corresponding to an advertisement. If a particular item has a profit margin of 5% or less, for example, then the algorithm might determine not to perform an adjustment. Other algorithms can consider the total profit of the item. For example, if an item has a relatively low conversion rate but has a high profit figure, such as for a plasma screen television, then the algorithm might allow an adjustment even though the conversion rate is relatively low.

Some algorithms might limit bid adjustments based on factors such as conversion rate, independent of profit. If a particular item has a conversion rate of 2% or less, meaning less than one out of every fifty users following the link actually purchases the item, then the algorithm might determine not to perform any adjustment for that advertisement. Any appropriate cutoff can be used, such as 3%, 5%, 10%, or any other appropriate amount. The conversion rate also can be determined at different levels, such as for a particular provider over a particular recent time period, etc., and different cutoffs can be used at different levels, etc.

Other algorithms can minimize the risk by preventing bid adjustments when there is no recorded revenue in some recent period. For example, if data for a keyword-landing page pair is at least a year old (or any other appropriate amount of time such as a day, week, or month), then the system may not allow an adjustment as any attempted adjustment could be unreliable. The amount of time determined to be "recent" can be a function of the attribution window for a particular system, for example, as well as how long data may reasonably affect a bid for a keyword. An algorithm also can be selected or generated that can set a limit on the multiplier or other factor using, for example, the number of clicks in the recent past in relation to the total number of clicks being analyzed to reach a significant result. In one example, if the data from the recent past would adjust by a smaller amount than the entire data set, then the multiplier can be capped at the lower number generated for the recent past. In another example, the value can be capped somewhere between the value for the recent past and the overall value, with the percentage between those two values being determined by factors such as the ratio of recent to non-recent data points. Such caps or limits can help to limit risk and exposure using an automated bid adjustment process.

If the adjustment factor exceeds the determined cap, but the cap allows for an adjustment, then the cap amount (or any related amount) can be used as the adjustment factor. A final bid adjustment factor then is determined that does not exceed any caps or thresholds for business or other reasons 520. The final adjustment factor then can be applied to the base bid, such as by multiplying the base bid by a normalized adjustment factor, to determine the final bid price 522. The final/adjusted bid then can be submitted with the advertising information to the appropriate provider 524.

As discussed above, a process such as that discussed above with respect to FIG. 5 can be used to generate only a bid adjustment factor in some embodiments, instead of a base bid and bid adjustment factor, which can be applied to a bid price generated using any other appropriate algorithm or determination approach. A base bid price can be determined for the keyword-landing page pair, such as by applying an efficiency model or revenue target as discussed herein. The process does not care how the original or "base" bid was calculated, only that the algorithm used to make the bid determination is consistent in determining base bids. Adjustment algorithms works on many regular bid algorithms, such as those discussed in the respective application incorporated by reference above, and hence will not be discussed herein in detail.

As a basic example of determining a bid price, an advertiser might offer an item that sells for $100, which has a 10% profit margin. If the advertiser is willing to spend 50% of the profit margin to advertise the item, then the advertiser has $5 to spend on average for each instance of that item. If the item for a particular provider has a 10% conversion rate, or one out of every ten people following the link will actually purchase the item, then the $5 can be spread out over ten advertisement instances where the user clicks on the ad, for a bid of $0.50 per click.

As discussed, there can be various data considered for each data set to be used in determining a bid adjustment. For example, one bidding chain might consider ad position in the determination. An advertiser might be willing to pay more to have an ad displayed in the top spot, or first in a list. If an advertiser is bidding $1.00 for an ad that is generating a lot of revenue, or has a high determined efficiency, then the advertiser would likely not want to lose the top spot for that ad if a competitor bids $1.10. In this case, the algorithm might take into account the fact that the ad is in the top spot and has a high efficiency, and set a higher maximum adjustment for that bid.

Also, an advertiser might get a discount for ads based on factors such as a high quality score, the advertiser generating a certain amount of revenue, or any other such factor. An algorithm then can take advantage of this information to adjust bid prices. For example, consider the ad above that is performing well, where the maximum bid is $1.00. If the advertiser gets a 30% discount, then the advertiser is effectively spending up to $0.70 per click. Since the bid determination system initially determined that the advertiser was willing to spend $1.00 per click, the system can decide to adjust the bid up about 30% so that the effective cost for each click is still at most $1.00, but the actual bid submitted can be up to about $1.30. The discount can be tracked over time to take into account recent changes, or data points from the recent past can be considered and/or weighted accordingly. If the advertiser used to get 30% but recently that changed to 10%, then the algorithm should rely more closely on the 10% discount in order to avoid overspending.

The algorithm thus can take into account the CPC ratio, which as discussed refers generally to the ratio between what an advertiser is willing to pay for an ad, and what the advertiser is actually paying. As a ratio, this value will range between 0 and 1. Once this ratio is determined, it can be applied to the bid prices in order to bid closer to the intended financial break even point and avoid underbidding and, accordingly, losing out on potential revenue. For stable auctions, the response of traffic to increasing bids is akin to a step function, as slight increases in the bid price will not result in an increase in traffic, but at some point the ad might jump to a higher position in the ranking, resulting in a much higher spend based on winning the bid for the higher placement. If the advertisement is selected properly, there will be a corresponding increase in revenue. If the advertisement was not selected properly, or there was not enough data to make a good decision, then the efficiency of the ad can suffer accordingly.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method in a computer system for generating a bid price for an electronic advertisement, comprising:
    under the control of one or more computer systems configured with executable instructions,
        selecting a keyword and a provider with which to place an advertisement, the provider operable to generate a page including content associated with the keyword;
        determining a first set of bidding data components related to the advertisement, each bidding data component containing data stored at a different level in a bidding data hierarchy related to an aspect of the advertisement;
        determining a minimum number of data points needed to determine a significant bidding result;
        selecting a second set of bidding components including a bidding data component at a lowest level in the first set of bidding components and including a number of data points at least meeting the minimum number of data points, the second set of bidding components including at least one bidding component at a next highest level in the bidding data hierarchy when the bidding data component at the lowest level does not include the minimum number of data points, the bidding data component at the lowest level having a first targeted data definition, the at least one bidding data component at the next highest level having a second targeted data definition of which the first targeted data definition is a subset, the second targeted data definition being broader than the first targeted data definition;
        selecting at least one time period over which to analyze data for each bidding component;
        determining a base bid price by analyzing first bid data for each of the second set of bidding components for each selected time period;
        determining a bid adjustment factor by analyzing second bid data for each of the second set of bidding components for each selected time period, the second bid data including previously submitted bid prices and actual costs incurred as a result of the previously submitted bid prices;
        determining a bid result by adjusting the base bid price by the bid adjustment factor; and
        submitting advertising information and the bid result to the provider for the keyword.

2. A method according to claim 1, further comprising:
weighting each bidding data component based at least in part on a number of data points for the data component compared to a number of data points remaining to reach the minimum number of data points.

3. A method according to claim 1, further comprising:
weighting each time period based at least in part upon a recency of the time period.

4. A method in a computer system for adjusting a bid price in an electronic environment, comprising:
under the control of one or more computer systems configured with executable instructions,
selecting a set of bidding components from a bidding data hierarchy, the set of bidding components including a bidding data component at a lowest level in the bidding data hierarchy and a number of bidding data components at next highest levels in the bidding data hierarchy needed to at least meet a minimum number of data points, the bidding data component at a lowest level having a data definition, the bidding data components at a next highest level in the hierarchy having a broader data definition of which lower level data definitions in the hierarchy are a subset;
selecting at least one time period over which to analyze data for each bidding component in the set;
determining a bid adjustment factor by analyzing bid data for each of the set of bidding components for each selected time period, the bid data including previously submitted bid prices and actual costs incurred as a result of the previously submitted bid prices;
determining a bid result by adjusting a base bid price by the bid adjustment factor; and
submitting the bid result to a provider operable to receive bids electronically.

5. A method according to claim 4, further comprising:
generating the base bid price.

6. A method according to claim 5, wherein:
the base bid price is generated by analyzing bid data for each of the set of bidding components for each selected time period.

7. A method according to claim 4, wherein:
each bidding data component is weighted based at least in part on a number of data points for that data component compared to a number of data points remaining to reach the minimum number of data points.

8. A method according to claim 4, wherein:
each time period is weighted based at least in part upon a recency of the time period.

9. A method according to claim 8, further comprising:
normalizing the weighted time periods before determining the bid adjustment factor.

10. A method according to claim 4, wherein:
the bid price is generated for an electronic advertisement to be generated for display by the provider.

11. A method according to claim 10, wherein:
the bid data analyzed for the bid adjustment factor includes a cost-per-click ratio for the advertisement and the provider.

12. A method according to claim 4, wherein:
each time period is a decay value having a half life and wherein analyzing bid data for the time period includes weighting corresponding data based at least in part on the half life.

13. A method according to claim 4, further comprising:
determining whether the bid adjustment factor exceeds a specified threshold for the adjustment; and
if the bid adjustment factor exceeds the specified threshold, setting the specified threshold as the bid adjustment factor.

14. A method according to claim 4, further comprising:
determining the minimum number of data points for the bid result to be of significance.

15. A method according to claim 4, further comprising:
preventing the base bid price from being adjusted if there is no data for any of the set of bidding components within a specified period of recency.

16. A method according to claim 4, further comprising:
storing data to the data hierarchy received as a result of submitting the bid result to the provider.

17. A system for adjusting a bid price in an electronic environment, comprising:
a processor; and
a memory device including instructions that, when executed by the processor, cause the processor to:
select bidding data components from a hierarchy of bidding data, including a bidding data component at a first level in the hierarchy and a number of bidding data components at next highest levels in the hierarchy needed to at least meet a specified number of data points for significance, the bidding data component at the first level having a data definition, the bidding components at next highest levels having subsequently broader data definitions of which lower level data definitions are a subset of a next highest level data definition in the hierarchy;
select at least one time period over which to analyze data for each selected bidding data component;
determine a bid adjustment factor by analyzing bid data for each of the bidding data components for each selected time period, the bid data including previously submitted bid prices and corresponding actual costs;
determine a bid result by multiplying the base bid price by the bid adjustment factor; and
submit the bid result to a provider operable to receive bids electronically.

18. A system according to claim 17, wherein the instructions, when executed by the processor, further cause the processor to:
generate the base bid price by analyzing bid data for each of the bidding components for each selected time period.

19. A system according to claim 17, wherein the instructions, when executed by the processor, further cause the processor to:
weight each bidding data component based at least in part on a number of data points for that bidding data component compared to a number of data points remaining to reach the minimum number of data points.

20. A system according to claim 17, wherein the instructions, when executed by the processor, further cause the processor to:
weight each time period based at least in part upon a recency of the time period.

21. A computer program product embedded in a computer readable storage medium for adjusting a bid price for an advertisement in an electronic environment, comprising:
program code executable by one or more processors for selecting bidding data components from a hierarchy of bidding data, including a bidding data component at a first level in the hierarchy and a number of bidding data components at next highest levels in the hierarchy needed to at least meet a specified number of data points for significance, the bidding data component at a first level having a data definition, the bidding components at a next highest level having broader data definitions than lower level data definitions, the lower level data definitions forming a subset of the next highest level in the hierarchy;

program code executable by the one or more processors for selecting at least one time period over which to analyze data for each selected bidding data component;

program code executable by the one or more processors for determining a bid adjustment factor by analyzing bid data for each of the bidding data components for each selected time period, the bid data including previously submitted bid prices and corresponding actual costs;

program code executable by the one or more processors for determining a bid result by multiplying the base bid price by the bid adjustment factor; and program code executable by the one or more processors for submitting the bid result to a provider operable to receive bids electronically.

22. A computer program product according to claim 21, further comprising:

program code executable by the one or more processors for generating the base bid price by analyzing bid data for each of the bidding components for each selected time period.

23. A computer program product according to claim 21, further comprising:

program code executable by the one or more processors for weighting each bidding data component based at least in part on a number of data points for that bidding data component compared to a number of data points remaining to reach the minimum number of data points.

24. A computer program product according to claim 21, further comprising:

program code executable by the one or more processors for weighting each time period based at least in part upon a recency of the time period.

25. A computer program product according to claim 21, wherein:

the bid data analyzed for the bid adjustment factor includes a cost-per-click ratio for the advertisement.

* * * * *